US012780008B2

(12) United States Patent
Betro' et al.

(10) Patent No.: US 12,780,008 B2
(45) Date of Patent: Nov. 3, 2026

(54) METHOD TO CONTROL AN ELECTRIC POWER SYSTEM OF AN ELECTRIC VEHICLE

(71) Applicant: FERRARI S.P.A., Modena (IT)

(72) Inventors: Roberto Betro', Modena (IT); Giorgio Bisceglie, Modena (IT); Valerio Dodet, Modena (IT); Giovanni Lo Calzo, Modena (IT); Ugo Sitta, Modena (IT); Procolo Ivan Borrino, Modena (IT)

(73) Assignee: FERRARI S.P.A., Modena (IT)

( * ) Notice: Subject to any disclaimer, the term of this patent is extended or adjusted under 35 U.S.C. 154(b) by 172 days.

(21) Appl. No.: 18/937,932

(22) Filed: Nov. 5, 2024

(65) Prior Publication Data

US 2025/0153574 A1 May 15, 2025

(30) Foreign Application Priority Data

Nov. 13, 2023 (IT) ........................ 102023000023958

(51) Int. Cl.
*B60L 15/00* (2006.01)
*B60L 3/00* (2019.01)

(52) U.S. Cl.
CPC ............. *B60L 15/007* (2013.01); *B60L 3/003* (2013.01); *B60L 2210/40* (2013.01)

(58) Field of Classification Search
CPC ..... B60L 15/007; B60L 3/003; B60L 2210/40
See application file for complete search history.

(56) References Cited

U.S. PATENT DOCUMENTS

| | | | | |
|---|---|---|---|---|
| 7,425,806 | B2 | 9/2008 | Schnetzka et al. | |
| 2004/0160201 | A1 | 8/2004 | Rahman et al. | |
| 2011/0066311 | A1* | 3/2011 | Itagaki .................... | B60L 58/21 903/930 |
| 2012/0091930 | A1* | 4/2012 | Takahashi ............... | B60L 58/15 307/80 |
| 2012/0235617 | A1 | 9/2012 | Singh | |

OTHER PUBLICATIONS

Italian Search Report for Application No. 202300023958; Filing Date: Nov. 13, 2023; Date of Mailing: May 3, 2024; 6 pages.

* cited by examiner

*Primary Examiner* — Zoheb S Imtiaz
(74) *Attorney, Agent, or Firm* — CANTOR COLBURN LLP

(57) ABSTRACT

A method to control an electric power system (18) of an electric vehicle and provided with at least two electric machines and two respective electronic DC-AC power converters. The steps provided are those of: controlling a first electronic power converter with a master switching period; controlling a second electronic power converter with a slave switching period; establishing a desired time difference between a switching of the first electronic power converter and a switching of the second electronic power converter; determining an actual time difference between the switching of the first electronic power converter and the switching of the second electronic power converter; and changing, if necessary, the sole slave switching period based on a comparison between the desired time difference with the actual time difference.

17 Claims, 4 Drawing Sheets

METHOD TO CONTROL AN ELECTRIC POWER SYSTEM OF AN ELECTRIC VEHICLE

CROSS-REFERENCE TO RELATED APPLICATIONS

This patent application claims priority from Italian patent application no. 102023000023958 filed on Nov. 13, 2023, the entire disclosure of which is incorporated herein by reference.

TECHNICAL FIELD

The present invention relates to a method to control an electric power system of an electric vehicle.

PRIOR ART

An electric vehicle comprises at least one electric machine which is electrically connected to a battery and is mechanically connected to the drive wheels. In particular, the electric power system of an electric vehicle comprises at least one electronic bidirectional DC-AC power converter (namely, an inverter) which on the DC side is connected to the battery and on the AC side is connected to the electric machine and has the function of controlling the electric machine.

During the operation of the electronic power converter, on the DC side an evident ripple of the voltage is manifested at the switching frequency of the electronic power converter (directly dependent on the rotation speed of the electric machine); this ripple of the voltage on the DC side subjects the electrochemical cells of the battery to a significant stress and must thus be filtered by installing on the DC side a filter capacitor having a suitable (i.e. sufficiently high) capacity.

If the vehicle comprises more electric machines (for example two electric machines connected to the two front and rear axles, or four electric machines connected to the four wheels), just as many electronic bidirectional DC-AC power converters (inverters) are obviously provided, all connected to the same battery; in this situation, the ripples of the voltage on the DC side determined by all the electronic power converters can also be summed (at least for several instants) and thus it is necessary to dimension the filter capacitor in order to be able to compensate the sum of all the ripples of the voltage caused by all the electronic power converters.

Patent application US2012235617A1 describes a system for controlling rotary electric machines to reduce the current ripple on a DC bus.

Patent application US2004160201A1 describes a multiple inverter system with low power bus ripples.

Patent U.S. Pat. No. 7,425,806B2 describes a system for controlling a variable speed drive.

DESCRIPTION OF THE INVENTION

The object of the present invention is to provide a method for controlling an electric power system of an electric vehicle, said control method allowing reducing the weight, the bulk and the cost of the filter capacitor and being simultaneously easy and cost-effective to implement.

According to the present invention, a method for controlling an electric power system of an electric vehicle is provided according to what is claimed in the appended claims.

The claims describe preferred embodiments of the present invention forming integral part of the present description.

BRIEF DESCRIPTION OF THE DRAWINGS

The present invention will now be described with reference to the accompanying drawings, which illustrate a non-limiting example embodiment thereof, wherein.

PREFERRED EMBODIMENTS OF THE INVENTION

Figure 1:
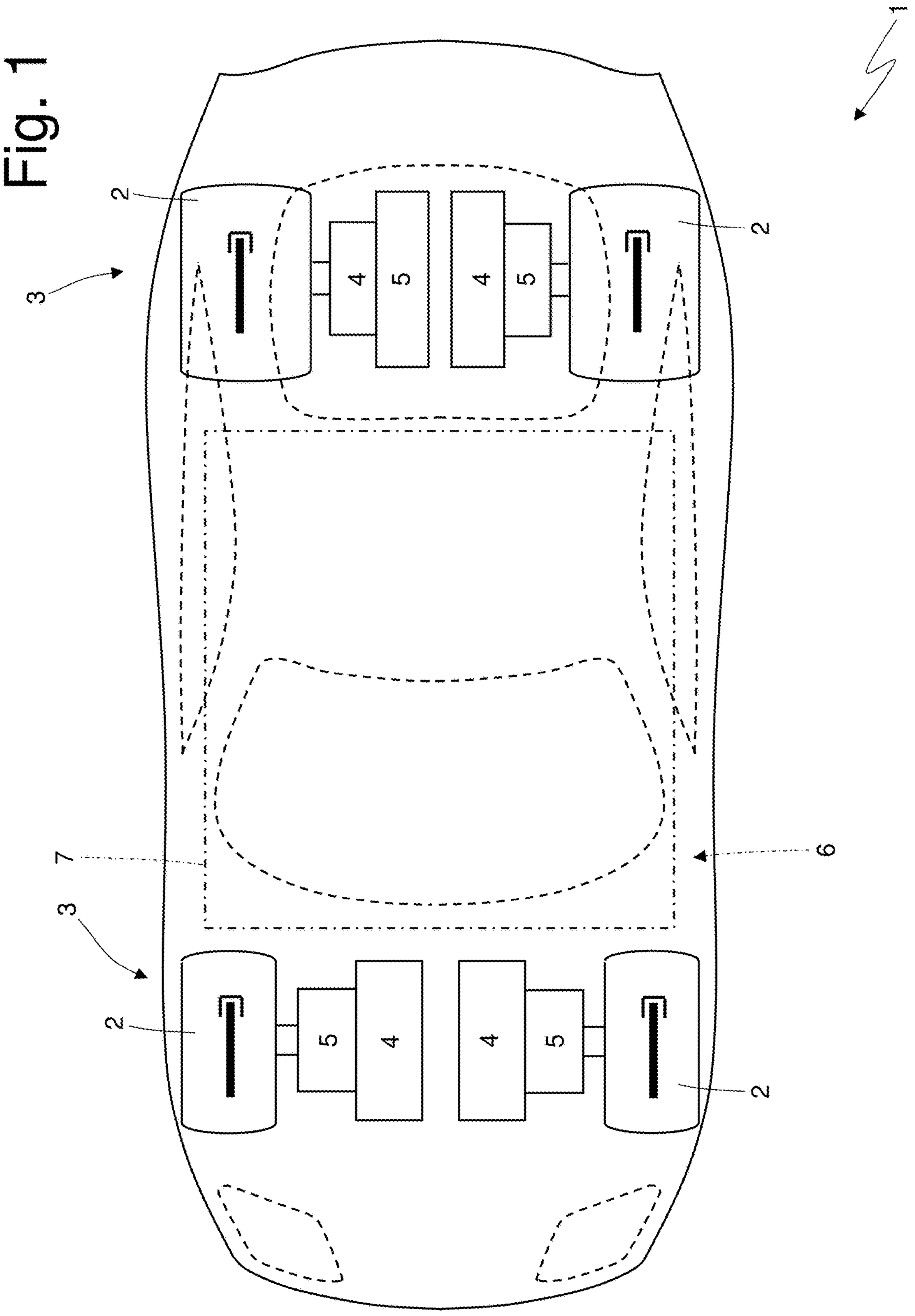
FIG. 1 is a schematic plan view of an electric road vehicle.

In FIG. 1, reference numeral 1 indicates, as a whole, an electric vehicle provided with two drive wheels 2 (two front drive wheels 2 and two rear drive wheels 2).

The vehicle 1 comprises an electric propulsion system 3 which is arranged in a front position (namely, is connected to the two front drive wheels 2), and an electric propulsion system 3 which is arranged in a rear position (namely, is connected to the two rear drive wheels 2), is structurally totally identical to the electric propulsion system 3 arranged in the front position, and is mechanically totally independent of and separated from the electric propulsion system 3 arranged in the front position.

According to a different embodiment not illustrated, the vehicle 1 comprises one single electric propulsion system 3 (arranged in a front position or arranged in a rear position) and thus has only two drive wheels 2; in this embodiment, the vehicle 1 could alternatively also comprise a thermal propulsion system connected to the drive wheels 2 which do not receive the motion from the single electric propulsion system 3.

In the embodiment illustrated in FIG. 1, each electric propulsion system 3 comprises a pair of reversible (i.e. that can operate both as electric motor absorbing electric energy and generating a mechanical torque, and as electric generator absorbing mechanical energy and generating electric energy) electric machines 4 provided with respective shafts and a pair of transmissions 5 which connect the electric machines 4 (namely, the shafts of the electric machines 4) to the corresponding drive wheels 2 without the interposition of any friction.

The vehicle 1 comprises a battery 6 provided with a container 7 and with a plurality of electrochemical cells which are arranged inside the container 7 and are adapted to convert the accumulated chemical energy into electric energy and vice versa.

Figure 2:
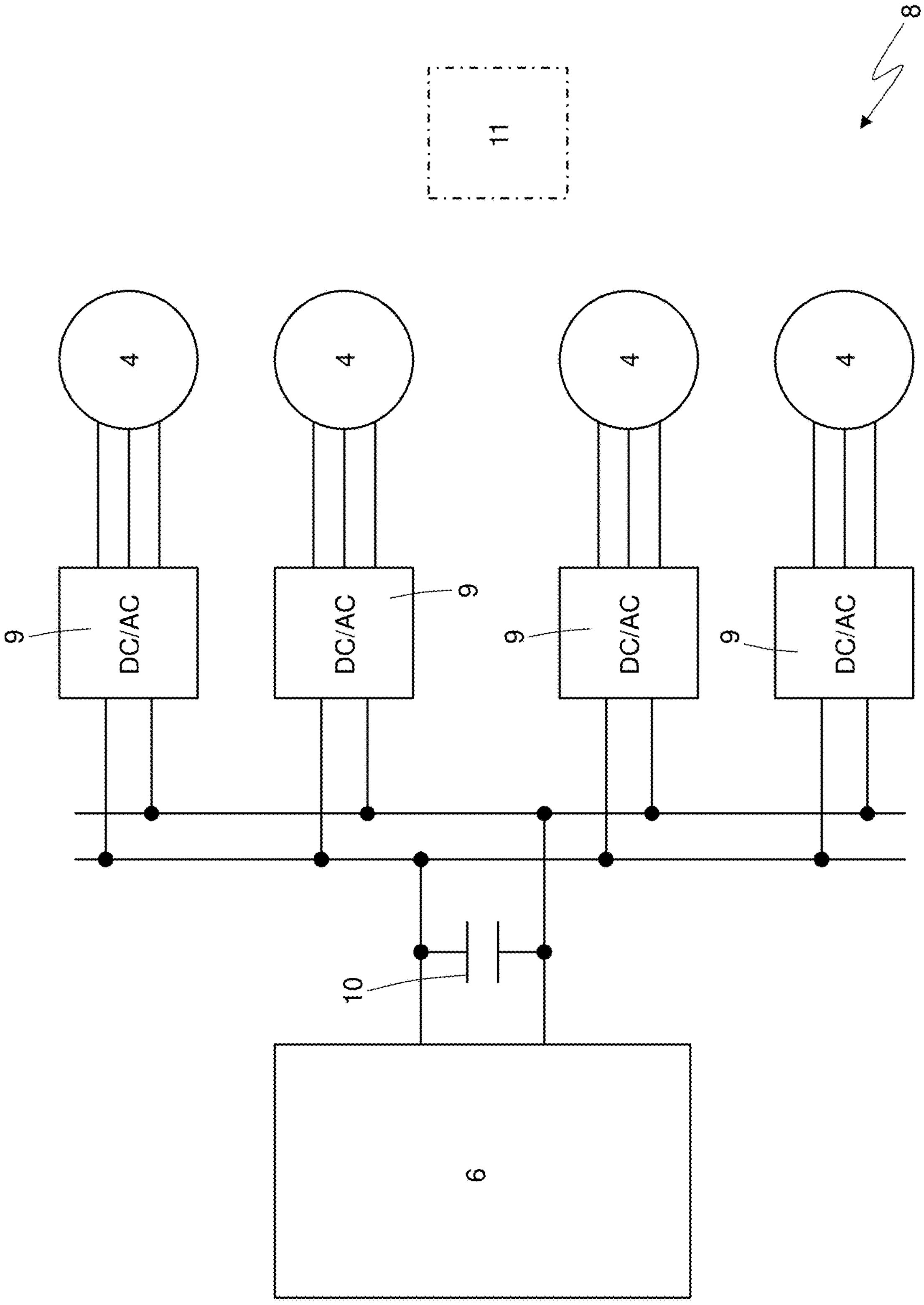
FIG. 2 is a schematic view of an electric power system of the road vehicle of FIG. 1.

According to what is illustrated in FIG. 2, the road vehicle 1 is provided with an electric power system 11, which comprises the battery 6 and four electronic DC-AC power converters s (inverters) 9, each controlling a respective electric machine 4; namely, each electronic power converter 9 has a DC side which is connected to the battery 6 and comprises a three-phase AC side which is connected to the respective electric machine 4.

Between the electronic power converters 9 and the battery 6, a filter capacitor 10 is interposed which has the function of filtering the high-frequency voltage ripples determined by the operation of the electronic power converters 9.

A control unit 11 is provided which controls the operation of each electronic power converter 9 for following a rotation speed target (positive for the forward movement and negative for the backward movement) of the respective electric machine 8 and a torque target (positive in the case of operation as motor, negative in the case of operation as generator) delivered or absorbed by the electric machine 8.

In use, each electronic power converter 9 applies a three-phase alternated voltage to the terminals of the electric machine 8 (and thus delivers/absorbs a three-phase alternating current which flows through the terminals of the electric machine 8). In particular, the control unit 11 translates the "mechanical" targets (rotation speed and delivered/absorbed torque of the electric machine 8) into "electric" targets (among which an electric power which has to be provided to/absorbed by the electric machine 8).

Figure 3:
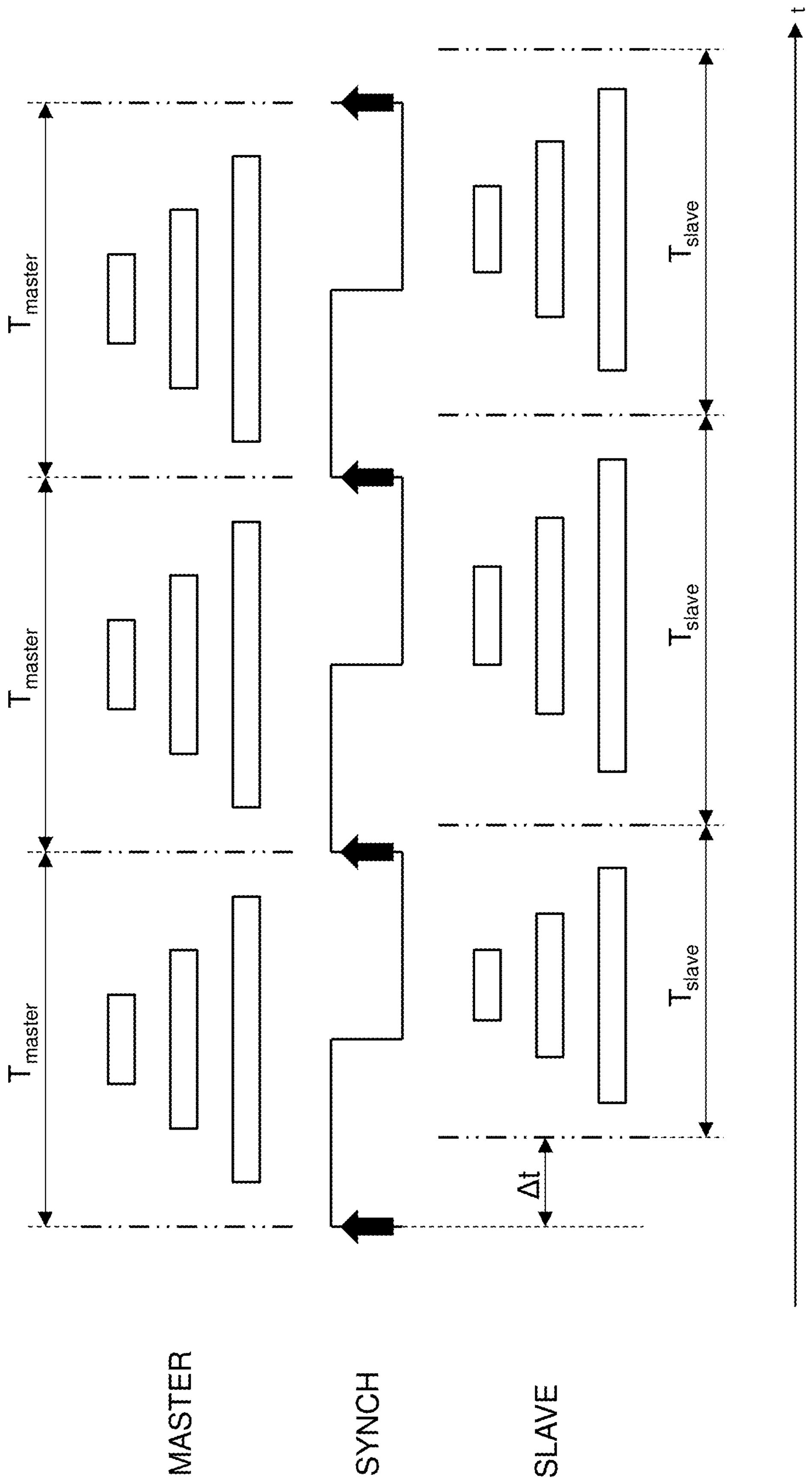
FIG. 3 is a schematic view of a control mode performed by a control unit of the electric power system of FIG. 2.

The control unit 11 identifies only one of the electronic power converters (inverters) 9 as master (namely, as guide) and identifies all the other electronic power converters (inverters) 9 as slave (namely, as followers of the master electronic power converter 9). FIG. 3 illustrates a control logic implemented in the control unit 11 (for simplicity, the behaviour of only one slave electronic power converter 9 is shown) which shows based on time t the sequence of the activations of the three phases for each switching cycle. According to what is illustrated in FIG. 3, the control unit 11 controls the master electronic power converter 9 with a master switching period $T_{master}$ and controls each slave electronic power converter 9 with a respective slave switching period $T_{slave}$ (potentially different for each slave electronic power converter 9).

The control unit 11 determines the master switching period $T_{master}$ solely based on a rotation speed of the corresponding electric machine 4; namely, the master switching period $T_{master}$ is established only based on the control needs of the corresponding electric machine 4 so as to perform the best control possible of the corresponding electric machine 4.

Figure 4:
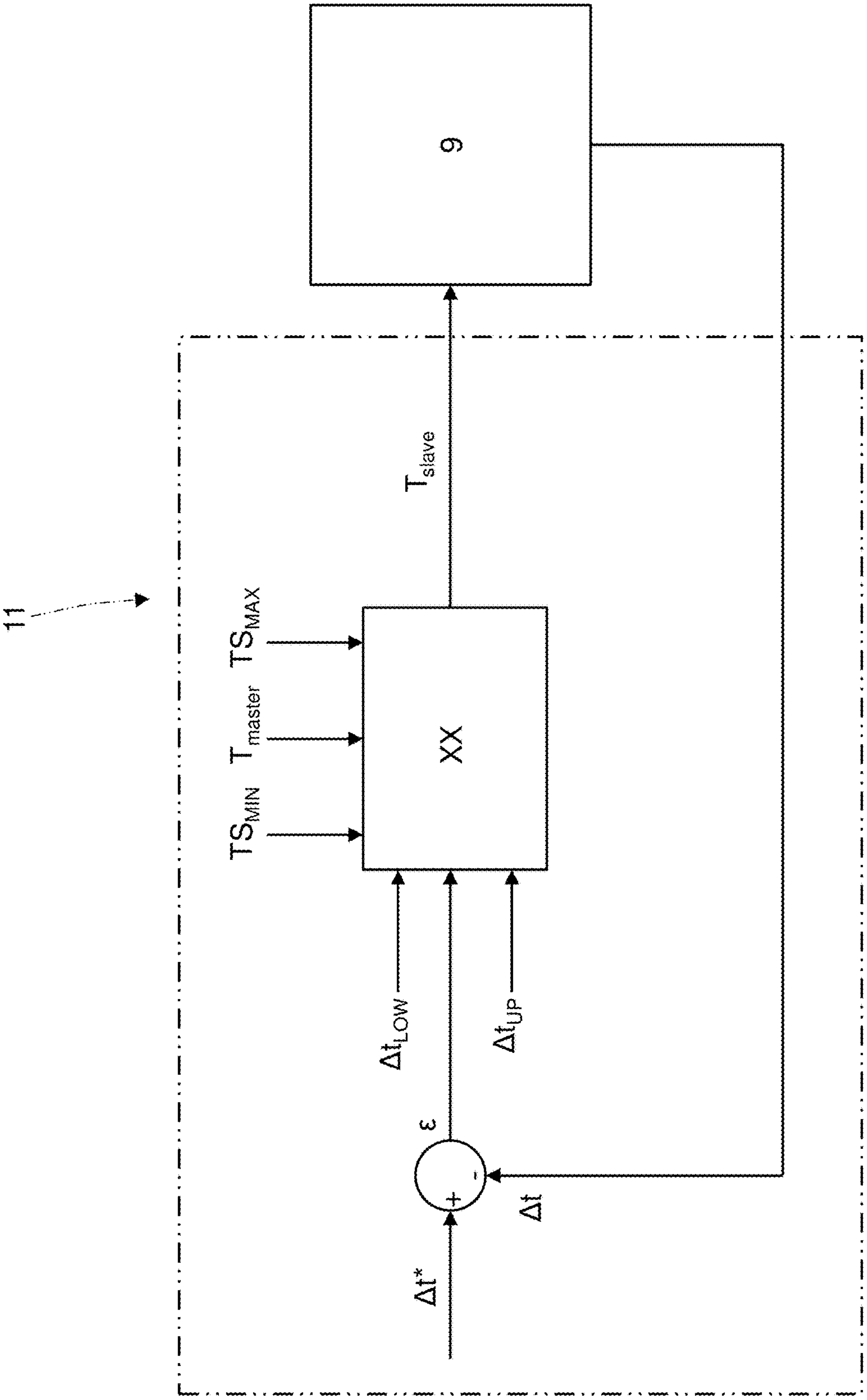
FIG. 4 is a block diagram which illustrates a control logic implemented in the control unit of the electric power system of FIG. 2.

In use and according to what is illustrated in FIG. 4, the control unit 11 establishes a desired time difference $\Delta t^*$ between a switching of the master electronic power converter 9 and a switching of each slave electronic power converter 9; in particular, the desired time difference $\Delta t^*$ is potentially different for each slave electronic power converter 9, namely the three desired time differences $\Delta t^*$ are not (always) the same with respect to one another. In particular, the desired time difference $\Delta t^*$ is determined based on the master switching period $T_{master}$ (namely, the desired time difference $\Delta t^*$ varies upon the varying of the master switching period $T_{master}$).

In the embodiment where only two electronic power converters 9 are present (one master electronic power converter 9 and one slave electronic power converter 9), the sole desired time difference $\Delta t^*$ is approximately one quarter of the master switching period $T_{master}$. In the embodiment where four electronic power converters 9 are present (one master electronic power converter 9 and three slave electronic power converters 9), the three desired time differences $\Delta t^*$ are different from one another and could, for example be equal, to one quarter, half and three quarters of the master switching period $T_{master}$.

In use and according to what is illustrated in FIG. 4, the control unit 11 determines an actual time difference $\Delta t$ between the switching of the master electronic power converter 9 and the switching of each slave electronic power converter 9 (obviously the actual time difference $\Delta t$ is potentially different for each slave electronic power converter 9) and thus compares each desired time difference $\Delta t^*$ with the respective actual time difference $\Delta t$. Furthermore, the control unit 11 changes, if necessary, the sole slave switching period $T_{slave}$ based on the comparison between the respective desired time difference $\Delta t^*$ with the respective actual time difference $\Delta t$; namely, the master switching period $T_{master}$ is always constant and solely established based on the rotation speed of the respective electric machine 4 and a (possible) difference between a desired time difference $\Delta t^*$ and the respective actual time difference $\Delta t$ determines (if necessary) only a variation of the corresponding slave switching period $T_{slave}$.

If a desired time difference $\Delta t^*$ is the same as the respective actual time difference $\Delta t$, the corresponding slave switching period $T_{slave}$ is set to be identical to the master switching period $T_{master}$ (namely, it is not necessary to insert a further switching between the master electronic power converter 9 and the corresponding slave electronic power converter 9).

If a desired time difference $\Delta t^*$ is (substantially) different from the respective actual time difference $\Delta t$, the corresponding slave switching period $T_{slave}$ is set to be different from the master switching period $T_{master}$ (namely, it is necessary to insert a further switching between the master electronic power converter 9 and the corresponding slave electronic power converter 9 for eliminating the difference between the desired time difference $\Delta t^*$ and the respective actual time difference $\Delta t$).

According to a preferred embodiment, if a desired time difference $\Delta t^*$ is (substantially) greater than the respective actual time difference $\Delta t$, the corresponding slave switching period $T_{slave}$ is set to be greater than the master switching period $T_{master}$ and, if a desired time difference $\Delta t^*$ is (substantially) smaller than the respective actual time difference $\Delta t$, the corresponding slave switching period $T_{slave}$ is set to be smaller than the master switching period $T_{master}$.

According to a preferred embodiment, a difference $\varepsilon$ is calculated between a desired time difference $\Delta t^*$ and the respective actual time difference $\Delta t$ ($\varepsilon=\Delta t^*-\Delta t$): if the difference $\varepsilon$ between the desired time difference $\Delta t^*$ and the respective actual time difference $\Delta t$ is smaller than a lower threshold $\Delta t_{UP}$ (having a negative value, i.e. lower than zero), the respective slave switching period $T_{slave}$ is set to be smaller than the master switching period $T_{master}$ and preferably equal to a minimum value $TS_{MIN}$ (obviously smaller than the master switching period $T_{master}$), if the difference $\varepsilon$ between the desired time difference $\Delta t^*$ and the respective actual time difference $\Delta t$ is greater than an upper threshold $\Delta t_{LOW}$ (having a positive value), the respective slave switching period $T_{slave}$ is set to be greater than the master switching period $T_{master}$ and preferably equal to a maximum value $TS_{MAX}$ (obviously greater than the master switching period $T_{master}$), and if the difference $\varepsilon$ between the desired time difference $\Delta t^*$ and the respective actual time difference $\Delta t$ is comprised between the lower threshold $\Delta t_{UP}$ (having a negative value) and the upper threshold $\Delta t_{LOW}$ (having a positive value), the respective slave switching period $T_{slave}$ is set to be the same as the master switching period $T_{master}$.

According to a preferred embodiment, the control unit 11 determines the lower threshold $\Delta t_{UP}$ (having a negative value) and the upper threshold $\Delta t_{LOW}$ (having a positive value) based on the master switching period $T_{master}$; namely, upon the varying of the master switching period $T_{master}$, also the lower threshold $\Delta t_{UP}$ and the upper threshold $\Delta t_{LOW}$ are varied. Similarly, according to a preferred embodiment, the control unit 11 determines the minimum value $TS_{MIN}$ and the maximum value $TS_{MAX}$ based on the master switching period $T_{master}$; namely, upon the varying of the master switching period $T_{master}$, also the minimum value $TS_{MIN}$ and the maximum value $TS_{MAX}$ are varied.

Preferably, the control unit 11 determines the minimum value $TS_{MIN}$ and the maximum value $TS_{MAX}$ assuming that a switching frequency difference $\Delta F$ is (by adding or subtracting) applied to the master switching period $T_{master}$; the switching frequency difference $\Delta F$ has to be sufficiently high for quite quickly allowing correcting the corresponding difference $\varepsilon$ between the desired time difference $\Delta t^*$ and the respective actual time difference $\Delta t$, but it must not be too large for avoiding an excessive difference between the master switching period $T_{master}$ and a slave switching period $T_{slave}$ (namely, for avoiding penalizing the quality of the control of the respective slave electronic power converter 9). The switching frequency difference $\Delta F$ which is added to/subtracted from the master switching period $T_{master}$ for determining the minimum value $TS_{MIN}$ and the maximum value $TS_{MAX}$ can be constant and predetermined or can also be variable (for example, based on the master switching period $T_{master}$/namely the switching frequency difference $\Delta F$ increases upon the decrease in the master switching period $T_{master}$).

Namely, the minimum value $TS_{MIN}$ and the maximum value $TS_{MAX}$ are calculated using the following equations:

$$TS_{MIN} = 1/(1/T_{master} + \Delta F)$$

$$TS_{MAX} = 1/(1/T_{master} - \Delta F)$$

By way of example, generally the minimum value $TS_{MIN}$ and the maximum value $TS_{MAX}$ differ from the master switching period $T_{master}$ by 0.1-10%.

The minimum value $TS_{MIN}$ is clearly lower than the maximum value $TS_{MAX}$ and thus when a slave switching period $T_{slave}$ is set to be equal to the minimum value $TS_{MIN}$, the respective slave electronic power converter 9 accelerates with respect to (goes faster than) the master electronic power converter 9, whereas when a slave switching period $T_{slave}$ is set to be equal the maximum value $TS_{MAX}$, the respective slave electronic power converter 9 slows down with respect to (goes slower than) the master electronic power converter 9.

Summarizing, if the difference $\varepsilon$ between the desired time difference $\Delta t^*$ and the respective actual time difference $\Delta t$ is smaller than the lower threshold $\Delta t_{UP}$ (having a negative value), it means that the actual time difference $\Delta t$ is higher than the desired time difference $\Delta t^*$ ($\varepsilon=\Delta t-\Delta t$) and thus it is necessary to accelerate the respective slave electronic power converter 9 setting the respective slave switching period $T_{slave}$ to be smaller than the master switching period $T_{master}$ and equal to the minimum value $TS_{MIN}$; whereas, if the difference $\varepsilon$ between the desired time difference $\Delta t^*$ and the respective actual time difference $\Delta t$ is greater than the upper threshold $\Delta t_{LOW}$ (having a positive value), it means that the actual time difference $\Delta t$ is lower than the desired time difference $\Delta t^*$ ($\varepsilon=\Delta t^*-\Delta t$) and it is thus necessary to slow down the respective slave electronic power converter 9 setting the respective slave switching period $T_{slave}$ to be greater than the master switching period $T_{master}$ and equal to the maximum value $TS_{MAX}$. Finally, if the difference $\varepsilon$ between the desired time difference $\Delta t^*$ and the respective actual time difference $\Delta t$ is comprised between the lower threshold $\Delta t_{UP}$ (having a negative value) and the upper threshold $\Delta t_{LOW}$ (having a positive value), it means that the actual time difference $\Delta t$ is quite (sufficiently) similar to the desired time difference $\Delta t^*$ ($\varepsilon=\Delta t^*-\Delta t$) and thus the respective slave electronic power converter 9 can have the same speed of the respective master electronic power converter 9 setting the respective slave switching period $T_{slave}$ to be identical to the master switching period $T_{master}$.

According to a preferred embodiment, the control unit 11 generates a synchronization signal SYNCH (illustrated in FIG. 3) exactly synchronized with the switching of the master electronic power converter 9; namely, the synchronization signal SYNCH indicates the operation of the master electronic power converter 9. Therefore, the control unit 11 determines the actual time difference $\Delta t$ of each slave electronic power converter 9 using the synchronization signal SYNCH as reference.

According to a preferred embodiment, the control unit 11 carries out the comparison between each desired time difference $\Delta t^*$ and the respective actual time difference $\Delta t$ and the consequent change, if needed, of the respective slave switching period $T_{slave}$ with every switching cycle of the electronic power converters 9. Namely, potentially with every switching cycle of the electronic power converters 9, each slave switching period $T_{slave}$ could be adapted for eliminating a possible difference between the respective desired time difference $\Delta t^*$ and the respective actual time difference $\Delta t$.

According to a preferred embodiment, the control unit 11 temporarily interrupts the change of the slave switching periods $T_{slave}$ based on the comparison between the desired time differences $\Delta t^*$ and the respective actual time differences $\Delta t$, when an absolute value of a difference between the rotation speeds of the electric machines 4 exceeds a synchronization threshold. In other words, in order to carry out a good control of an electric machine 4, it is necessary for the switching period to be suitable to the rotation speed of the electric machine 4: when all the electric machines 4 approximately have the same speed (namely, when the vehicle 1 is travelling along a straight road), it is possible to set each slave switching period $T_{slave}$ to be the same as the master switching period $T_{master}$ or anyway not much different from the master switching period $T_{master}$ and instead, when the electric machines 4 have different speeds (namely, when the vehicle 1 is travelling along a curve and thus the wheels 2 outside the curve have to rotate faster than the wheels 2 inside the curve) it can be more convenient not to link the slave switching periods $T_{slave}$ to the master switching period $T_{master}$ so as to be free to choose the slave switching periods $T_{slave}$ more suitable to the actual rotation speeds of the respective electric machines 4. It is important to observe that during the travelling of a curve, the electric machines 4 are hardly called to generate or absorb high torques and mechanical powers (namely, close to the maximum values) and thus the fact of compensating in a less effective manner the voltage ripple on the DC side is less penalizing (stressful) for the battery 6.

In the embodiment illustrated in the accompanying figures, four electronic power converters (inverters) 9 are present and thus one master electronic power converter 9 and three slave electronic power converters 9; according to other embodiments not illustrated, a different number of electronic power converters (inverters) 9 is provided, for example two or three electronic power converters (inverters) 9 and thus one master electronic power converter 9 and one or two slave electronic power converters 9.

The embodiments described herein can be combined with one another without departing from the scope of protection of the present invention.

The above-described control method has numerous advantages.

Firstly, the above-described control method allows minimizing the ripple of the voltage on the DC side since the voltage ripples generated by the various electronic power converters (inverters) 9 tend to compensate (reduce) one another rather than summing up. In other words, the above-described control method allows obtaining a destructive interference, rather than a constructive interference, between the voltage ripples generated by the various electronic power converters (inverters) 9 and thus allows reducing in a substantial manner the ripple of the voltage on the DC side.

Therefore, thanks to the above-described control method, it is possible to reduce the capacity of the filter capacitor 10: some simulations have demonstrated that, thanks to the above-described control method, the capacity of the filter capacitor 10 can be reduced by 40-50%. In this manner, the filter capacitor 10 is smaller (less bulky), lighter and less expensive.

Furthermore, the above-described control method is easy and cost-effective to implement, since it does not require a high calculation power, does not require a relevant memory occupation, and especially does not require the installation of any additional physical component (hardware) with respect to what normally provided (and thus the above-described control method can also be installed in an existing road vehicle 1 with a simple software updating).

| LIST OF THE REFERENCE NUMERALS OF THE FIGURES | |
|---|---|
| 1 | vehicle |
| 2 | wheels |
| 3 | propulsion system |
| 4 | electric machine |
| 5 | transmission |
| 6 | battery |
| 7 | container |
| 8 | electric power system |
| 9 | electronic power converter |
| 10 | filter capacitor |
| 11 | control unit |
| t | time |
| $T_{master}$ | master switching period |
| $T_{slave}$ | slave switching period |
| $\Delta t^*$ | desired time difference |
| $\Delta t$ | actual time difference |
| $\Delta t_{UP}$ | lower threshold |
| $\Delta t_{LOW}$ | upper threshold |
| $\varepsilon$ | difference |
| $TS_{MIN}$ | minimum value |
| $TS_{MAX}$ | maximum value |
| SYNCH | synchronization signal |

The invention claimed is:

1. A method to control an electric power system (18) of an electric vehicle (1) and provided with at least two electric machines (4); the electric power system (18) comprises two electronic DC-AC power converters (9), each having a DC side connected to a battery (6) and an AC side connected to a respective electric machine (4); the control method comprises the steps of:

controlling a first electronic power converter (9) with a master switching period ($T_{master}$);

controlling a second electronic power converter (9) with a slave switching period ($T_{slave}$);

establishing a desired time difference ($\Delta t^*$) between a switching of the first electronic power converter (9) and a switching of the second electronic power converter (9);

determining an actual time difference ($\Delta t$) between the switching of the first electronic power converter (9) and the switching of the second electronic power converter (9);

comparing the desired time difference ($\Delta t^*$) with the actual time difference ($\Delta t$); and changing, if necessary, the sole slave switching period ($T_{slave}$) based on the comparison between the desired time difference ($\Delta t^*$) with the actual time difference ($\Delta t$).

2. The control method according to claim 1, wherein, if the desired time difference ($\Delta t^*$) is the same as the actual time difference ($\Delta t$), the slave switching period ($T_{slave}$) is set to be identical to the master switching period ($T_{master}$).

3. The control method according to claim 1, wherein, if the desired time difference ($\Delta t^*$) is different from the actual time difference ($\Delta t$), the slave switching period ($T_{slave}$) is set to be different from the master switching period ($T_{master}$).

4. The control method according to claim 3, wherein, if the desired time difference ($\Delta t^*$) is greater than the actual time difference ($\Delta t$), the slave switching period ($T_{slave}$) is set to be greater than the master switching period ($T_{master}$) and, if the desired time difference ($\Delta t^*$) is smaller than the actual time difference ($\Delta t$), the slave switching period ($T_{slave}$) is set to be smaller than the master switching period ($T_{master}$).

5. The control method according to claim 1, wherein:

if a difference (a) between the desired time difference ($\Delta t^*$) and the actual time difference ($\Delta t$) is smaller than a lower threshold ($\Delta t_{UP}$), the slave switching period ($T_{slave}$) is set to be smaller than the master switching period ($T_{master}$);

if the difference (E) between the desired time difference ($\Delta t^*$) and the actual time difference ($\Delta t$) is greater than an upper threshold ($\Delta t_{LOW}$), the slave switching period ($T_{slave}$) is set to be greater than the master switching period ($T_{master}$); and if the difference (c) between the desired time difference ($\Delta t^*$) and the actual time difference ($\Delta t$) is comprised between the lower threshold ($\Delta t_{UP}$) and the upper threshold ($\Delta t_{LOW}$), the slave switching period ($T_{slave}$) is set to be the same as the master switching period ($T_{master}$).

6. The control method according to claim 5, wherein the lower threshold ($\Delta t_{UP}$) is negative and the upper threshold ($\Delta t_{LOW}$) is positive.

7. The control method according to claim 5 and comprising the further step of determining the lower threshold ($\Delta t_{UP}$) and the upper threshold ($\Delta t_{LOW}$) based on the master switching period ($T_{master}$).

8. The control method according to claim 5, wherein:

if a difference ($\varepsilon$) between the desired time difference ($\Delta t^*$) and the actual time difference ($\Delta t$) is smaller than the lower threshold ($\Delta t_{UP}$), the slave switching period ($T_{slave}$) is set to be equal to a minimum value ($TS_{MIN}$) smaller than the master switching period ($T_{master}$); and if the difference(s) between the desired time difference ($\Delta t^*$) and the actual time difference ($\Delta t$) is greater than the upper threshold ($\Delta t_{LOW}$), the slave switching period ($T_{slave}$) is set to be equal to a maximum value ($TS_{MAX}$) greater than the master switching period ($T_{master}$).

9. The control method according to claim 8 and comprising the further step of determining the minimum value ($TS_{MIN}$) and the maximum value ($TS_{MAX}$) based on the master switching period ($T_{master}$).

10. The control method according to claim 9, wherein the minimum value ($TS_{MIN}$) and the maximum value ($TS_{MAX}$)

are determined assuming that a switching frequency difference ($\Delta F$) is applied to the master switching period ($T_{master}$).

11. The control method according to claim 10, wherein the minimum value ($TS_{MIN}$) and the maximum value ($TS_{MAX}$) are calculated using the following equations:

$$TS_{MIN} = 1/(1/T_{master} + \Delta F)$$

$$TS_{MAX} = 1/(1/T_{master} - \Delta F)$$

$TS_{MIN}$ minimum value;

$TS_{MAX}$ maximum value;

$T_{master}$ master switching period;

$\Delta F$ switching frequency difference.

12. The control method according to claim 1 and comprising the steps of:

generating a synchronization signal (SYNCH) exactly corresponding to the switching period of the first electronic power converter (9); and determining the actual time difference ($\Delta t$) using the synchronization signal (SYNCH) as reference.

13. The control method according to claim 1 and comprising the further step of determining the desired time difference ($\Delta t^*$) based on the master switching period ($T_{master}$).

14. The control method according to claim 13, wherein the desired time difference ($\Delta t^*$) approximately is one quarter of the master switching period ($T_{master}$).

15. The control method according to claim 1, wherein the master switching period ($T_{master}$) is solely determined based on a rotation speed of the corresponding electric machine (4).

16. The control method according to claim 1, wherein the comparison between the desired time difference ($\Delta t^*$) and the actual time difference ($\Delta t$) and the consequent change, if needed, of the slave switching period ($T_{slave}$) are carried out with every switching cycle of the electronic power converters (9).

17. The control method according to claim 1 and comprising the further step of temporarily interrupting the change of the slave switching period ($T_{slave}$) based on the comparison between the desired time difference ($\Delta t^*$) and the actual time difference ($\Delta t$), when an absolute value of a difference between the rotation speeds of the two electric machines (4) exceeds a synchronization threshold.

* * * * *